3,129,133
COLLOIDAL DISPERSIONS OF PARTIALLY CURED POLYEPOXIDES, THEIR PREPARATION AND USE FOR PREPARING WET STRENGTH PAPER
Marshall E. Doyle, Alameda, and Melvin E. Nicholsen, Jr., Oakland, Calif., assignors to Shell Oil Company, New York, N.Y., a corporation of Delaware
No Drawing. Filed Apr. 21, 1960, Ser. No. 23,618
10 Claims. (Cl. 162—164)

This invention relates to colloidal dispersions of partially cured polyepoxides and their preparation. More particularly, the invention relates to stable aqueous colloidal dispersions of polyepoxides which have been partially reacted with epoxy curing agents, and to the use of these colloidal dispersions, particularly in the preparation of paper having improved wet strength.

Specifically, the invention provides new and particularly useful stable colloidal dispersions in water of a partial reaction product of a polyepoxide having some solubility in water, and preferably a glycidyl polyether of a polyhydric alcohol, with at least an equivalent amount of a polyfunctional epoxy resin curing agent, and preferably one having a plurality of amino hydrogen atoms. The invention further provides a process for preparing the above-described colloidal dispersions which comprise reacting the polyepoxide with at least an equivalent amount, and preferably two to four times the equivalency of a polyfunctional curing agent, preferably in the presence of a small amount of water and before gelation takes place quenching the reacting with a large quantity of water and stirring the resulting mixture.

As a special embodiment, the invention provides a method for preparing paper having improved wet strength which comprises adding the above-described colloidal dispersions to the aqueous pulp slurry at the beater stage, forming sheets of paper from the resulting mixture in the conventional manner and heating to complete the cure of the polyepoxide.

Cellulosic paper when wet loses its strength and is easily torn. In order to overcome this defect, it has been common practice to treat the paper with a nitrogen-containing resin, such as urea or melamine-formaldehyde resins, that can be subsequently cured to form an insoluble material. While this method has imparted some improvement in wet strength, it still fails to give a product having properties required for many commercial applications. The wet strength provided by this method, for example, is not as high as desired. In addition, paper treated in this manner generally loses its customary feel, becomes quite brittle, loses some of its absorbency, and has poor fold endurance. Furthermore, such paper has poor resistance to acids and alkali and is unsuited for use where the paper must come in contact with these chemicals.

It has been found that many of the above-described defects can be corrected by impregnating the paper with an aqueous solution of a polyepoxide and an epoxy curing agent and heating the impregnated paper to cure the polyepoxide. The paper treated in this method, for example, has unexpectedly good wet and dry strength, good resistance to hydrolysis, good absorbency and fold endurance, and good resistance to chemicals.

For commercial operations, the paper industry generally prefers to add the wet strength agent during the formation of the paper at the beater stage. This has the advantage of allowing for a rapid change-over in pulp supply, of requiring little or no modification of existing plant equipment and of permitting better control of product. While the above-noted polyepoxides can be employed in the beater stage, they are, however, not particularly suited for this application because of their limited substantivity to cellulose. Because of this, the amount of the polyepoxide that can be incorporated in the paper at the beater stage is limited. Therefore, it would be highly desirable to devise a means for improving the substantivity of the polyepoxides to cellulose so that the above-noted advantages may be utilized in commercial applications.

It is an object of the invention, therefore, to provide new colloidal dispersions of epoxy containing materials and a method for their preparation. It is a further object to provide new aqueous colloidal dispersions of partially reacted epoxy containing materials. It is a further object to provide new stable aqueous colloidal dispersions of partially cured polyepoxides which are particularly useful and valuable in industry. It is a further object to provide new colloidal dispersions of polyepoxide materials which have unexpectedly high substantivity to cellulosic materials. It is a further object to provide a new method for preparing paper having improved wet strength by addition of the additive at the wet end. It is a further object to provide a method for preparing wet strength paper which has high wet strength which is of a permanent nature and not lost through hydrolysis. It is a further object to provide wet strength paper which has normal feel, excellent fold endurance, and good absorbency. It is a further object to provide a method for preparing paper having good resistance to acids and alkali. It is a further object to provide a method for preparing improved cellulosic products. Other objects and advantages of the invention will be apparent from the following detailed description thereof.

It has now been discovered that these and other objects may be accomplished by the new products of the invention which comprise stable colloidal dispersions in water of a partially cured reaction product of a polyepoxide having more than one vic-epoxy group and some solubility in water, and preferably a glycidyl polyether of a polyhydric alcohol, with at least an equivalent amount of a polyfunctional curing agent, and preferably one containing a plurality of amino hydrogen atoms. These new products are preferably prepared by reacting the polyepoxide with polyfunctional curing agent, preferably in a small amount of water, and before gelation takes place quenching the product with a large quantity of water and stirring.

The above-described colloidal dispersions have surprising stability in that they can be stored for years without undergoing appreciable cure and settling out of the aqueous system. The presence of the water under the conditions of the process appears to have a stopping and stabilizing effect on epoxy cures not known heretofore. The new process is thus a very practical way of forming many stable "B" stage products which have heretofore never been available.

It has also been unexpectedly found that aqueous colloidal dispersions, as described above, have a high degree of substantivity toward cellulosic materials and are suited for treating cellulosic products, such as textiles, paper, and the like to impart improved properties thereto. It has been found, for example, that the new colloidal dispersions are particularly suited for use as in preparing paper which has a high wet strength. While these new colloidal dispersions may be applied to already finished paper or at the wet end, it is found that particular advantages are obtained by using them at the wet end, say at the beater stage, because of their high substantivity to the cellulose pulp. Paper prepared with the new colloidal dispersions has very high wet and tensile strength which is permanent and is not lost through hydrolysis as is the case with the wet strength obtained with conventional resins. Furthermore, the improvement in wet strength is obtained without change in feel, appearance, or absorbency of the paper, and the treated paper has surprisingly good resilience and good fold endurance. This makes the paper suitable for use in all kinds of wrappers, containers, all types of paper towels, napkins, tissues, paper drapes, maps, and the like. In addition, the above process yields paper having good resistance, having acids and alkali and is thus suited for use in preparing papers for construction purposes, battery manufacturers, and the like.

Polyepoxides to be used in the preparation of the new colloidal dispersions comprise those compounds having more than one vic-epoxy group and have some solubility in water. The preferred polyepoxides are those having a solubility of from 1% to about 40% solubility. The polyepoxides themselves may be saturated or unsaturated aliphatic cycloaliphatic, aromatic, or reterocyclic and may be substituted as desired with various substituents such as hydrogen atoms, hydroxyl groups, ether radicals, and the like.

For clarity, many of the polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2,3,4- and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Examples of polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxyaldehydes, hydroxy ketones, halogenated polyhydric alcohols, and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, sorbitol, mannitol, inositol, trimethylolpropane, bis(4-hydroxycyclohexyl) dimethyl-methane, 1,4-dimethylolbenzene, 4,4'-dimethylol diphenyl, dimethylol toluenes, and the like. The polyhydric ether alcohols include, among others, diglycerol, triglycerol, dipentaerythritol, tripentaerythritol, dimethylolanisoles, beta hydroxyethyl ethers of polyhydric alcohols, such as diethylene glycol, polyethylene glycols, bis(beta-hydroxyethyl ether) of hydroquinone, bis(beta-hydroxyethyl ether) of bis-phenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxydiethyl sulfide, 2,2'-3,3'- tetrahydroxy dipropyl sulfide, etc. The hydroxy aldehydes and ketones may be exemplified by dextrose, fructose, maltose, glyceraldehyde. The mercapto (thiol) alcohols may be exemplified by alpha-monothioglycerol, alpha,alpha'-dithioglycerol, etc. The polyhydric alcohol esters may be exemplified by monoglycerides, such as monostearin, monoesters of pentaerythritol and acetic acid, butyric acid, pentanoic acid, and the like. The halogenated polyhydric alcohols may be exemplified by the monochloride of pentaerythritol, monochloride of sorbitol, monochloride of mannitol, monochloride of glycerol, and the like.

Other polyepoxides include the polyepoxypolyhydroxy polyethers obtained by reacting, preferably in an alkaline medium, a polyhydric alcohol or polyhydric phenol with a polyepoxide, such as the reaction product of a glycidyl ether of a polyhydric phenol with the same or different polyhydric phenol, the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

Other examples of polyepoxides comprise the polyethers obtained by reacting, preferably in an alkaline medium, a halogen-containing epoxide, such as epichlorohydrin, with polyhydric phenols, such as resorcinol, catechol, 2,2-bis(4'-hydroxyphenyl)propane, bis [4-(2'-hydroxynaphth-l-yl)2-2-hydroxy-naphth-l-yl] methane, and the like.

Other polyepoxides include the polymers and copolymers of the allylic ether of epoxy-containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl ether-allyl benzoate copolymer, poly(vinyl 2,3-epoxypropyl)ether and an allyl glycidyl ether-vinyl acetate copolymer.

Coming under special consideration are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of equichlorohydrin for every equivalent of hydroxy group in the polyhydric alcohol. The resulting chlorohydrin ether is then dehydrochlorinated by heating at about 50° C. to 125° C. with a small, e.g., 10% stoichiometrical excess of a base, such as sodium aluminate.

The products obtained by the method shown in the preceding paragraph may be described as polyether polyepoxide reaction products which in general contain at least three non-cyclic ether (—O—) linkages, terminal epoxide-containing ether,

groups and halogen attached to a carbon of an intermediate group.

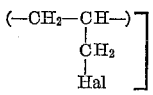

These halogen-containing polyether polyepoxide reaction products obtainable by partial dehydrohalogenation of polyhalohydrin alcohols may be considered to have the following general formula

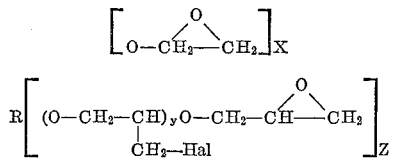

in which R is the residue of the polyhydric alcohol which may contain unreacted hydroxyl groups, X indicates one or more of the epoxy ether groups attached to the alcohol residue, $y$ may be one or may vary in different reaction products of the reaction mixture from zero to more than one, and Z is one or more, and $X+Z$, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

Polyether A

About 276 parts (3 moles) of glycerol was mixed with 10 parts of diethyl ether solution containing about 4.5% boron trifluoride. 832 parts of epichlorohydrin was then added dropwise. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether A.

Polyether B 10.5 moles of ethylene oxide was bubbled through 3.5 moles glycerine containing an acid catalyst at 40–50° C. The resulting product had a molecular weight of 224 and a hydroxyl value of 1.417 eq./100 g. 101 parts of this ethylene oxide glycerine condensate was placed in a reaction kettle and heated to 65–70° C. Sufficient BF$_3$-ethyl ether complex was added to bring the pH to about 1.0 and then 132 parts of epichlorohydrin added dropwise. After all the epi had been added, the reaction was continued for about 15 minutes to assure complete reaction. This product was then dissolved in benzene and 57 parts of sodium hydroxide was added in 7 equal portions at about 87–89° C. over a period of ¾ hour and then filtered to remove the salt. The solvent and light ends were then removed by stripping at a low vacuum. The resulting product had a molecular weight of 455, and an epoxy value of .524 eq./100 g. For convenience, this polyether will be referred to herein as Polyether B.

Polyether C

One equivalent of 1,2,6-hexanetriol was placed in a reaction kettle and heated to 65–70° C. Sufficient BF$_3$-ethyl ether complex was added to bring the pH to about 1.0 and then 1 equivalent of epichlorohydrin added dropwise. After all the epi had been added, the reaction was continued for about 15 minutes to assure complete reaction. This product was then dissolved in acetone and sodium orthosilicate was added at about 65° C. over a period of 0.5 hour and then filtered to remove the salt. The solvent and light ends were then removed by stripping at a low vacuum. The resulting product had a molecular weight of 325 and an epoxy value of .600 eq./100 g. For convenience, this polyether will be referred to herein as Polyether C.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Also of importance are the monomeric and polymeric glycidyl polyethers of dihydric phenols obtained by reacting epichlorohydrin with a dihydric phenol in an alkaline medium. The monomeric products of this type may be represented by the general formula

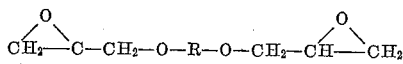

wherein R represents a divalent hydrocarbon radical of the dihydric phenol. The polymeric products will generally not be a single simple molecule but will be a complex mixture of glycidyl polyethers of the general formula

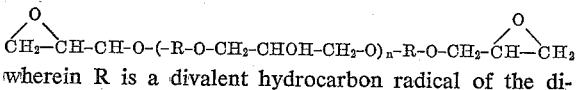

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may, in some cases, contain a very small amount of material with one or both of the terminal glycidyl radicals in hydroated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

Polyether D

About 2 moles of bis-phenol was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as Polyether D.

*Polyether E*

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value of 0.40 eq./100 g. and an epoxy equivalency of 1.9. For convenience, this product will be referred to as Polyether E.

Particularly preferred members of the above-described group are the glycidyl polyethers of the dihydric phenols, and especially the 2,2-bis(4-hydroxyphenyl)alkanes, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxylene" resins. See Chemical Week, vol. 69, page 27, for September 8, 1951.

Other examples include epoxidized esters of polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl oleostearate, monoglycerides of tung oil fatty acids, monoglycerides of soybean oil, sunflower, rapeseed, hempseed, sardine, cottonseed, and the like.

Another group of polyepoxides useful in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4-epoxyheptyl) sulfonyldibutyrate, tri(2,3-epoxypropyl) 1,2,4-butanetricarboxylate, di(5,6-epoxypentadecyl) tartarate, di(4,5-epoxytetradecyl) maleate, di(3,4-epoxybutyl) citrate, and di(4,5-epoxyoctadecyl) malonate. Preferred members of this group comprise the glycidyl esters, such as glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10-11-diethyl-8,9,12,13-diepoxy-eicosanedioate, dihexyl 6,7,10-11-diepoxyhexadecanedioate, didecyl 9, epoxy-ethyl-10,11-epoxyoctadecenedioate, dibutyl 3-butyl-3,4,5,6-diepoxycyclohexane-1,2-dicarboxylate, dicyclohexyl 3,4,5,6-diepoxycyclohexane-1, 2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (hycar rubbers), butadienestyrene copolymers and the like.

Of special interest are the polyepoxides containing elements only of the group consisting of carbon, hydrogen, oxygen and chlorine, with the oxygen being in only ether, ester or epoxy groups.

The epoxy curing agent to be employed in the preparation of the new colloidal dispersions comprise the polyfunctional curing agent such as the polycarboxylic acids, polycarboxylic acid anhydrides, polymercaptans, and particularly the polyamines. The preferred polyamines to be employed are those having a plurality of amino groups at least one of which is a primary amino group, i.e., an amino nitrogen attached to two hydrogen atoms. These polyamines may be aliphatic, cycloaliphatic or aromatic and may be saturated or unsaturated. Examples of the polymines include, among others, ethylene diamine, 1,4-butanediamine, 1,6-hexanediamine, o-, p- and m-phenylenediamine, 1,8-octanediamine, 3,3-diphenyldiamine, 1,4-naphthalinediamine, 1,2,3-benzenetriamine, diethylene triamine, tripropylene tetramine, triethylene tetramine, heptaethylene octamine, 1,2-diamino-2-methylpropane, 2,3-diamino-2-methylbutane, 2,4-diamino-2-methylpentane, 2,3-diamino-2,3-dimethylbutane, 2,5-diamino-2,5-dimethylhexene, 2,6-diamino-2,6-dimethylheptane and the like.

A preferred group of polyamines to be used in preparing the colloidal dispersions comprise the aliphatic and aromatic polyamines containing no more than 24 carbon atoms, and more particularly amines of the formulae

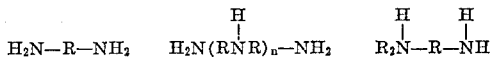

wherein R is a divalent hydrocarbon radical, and R is a monovalent hydrocarbon radical, and preferably aliphatic and aromatic hydrocarbon radicals containing no more than 18 carbon atoms, and $n$ is an integer, preferably from 1 to 8.

Coming under special consideration, particularly because of the superior colloidal suspensions obtained by their use are the soluble (in acetone) adducts of polyamines and polyepoxides, and salts thereof. Polyamines employed may be any of those described above and the polyepoxides employed may be any of those described above. The adducts are preferably prepared by bringing the polyamine and polyepoxide together in special proportions at temperatures generally ranging from about 15°

C. to 150° C. The adduct is obtained when the polyepoxide is reacted with at least one and preferably from 1.5 to 3 equivalents of the amine per equivalent of the epoxide. Aside from matters of economy, there is no particular upper limit to the ratio. The unreacted amine can be removed at the end by suitable means, such as distillation, extraction and the like. If any one or more of the reactants are solid, inert diluents or solvents may be employed, such as dioxane, toluene, chloroform and the like.

The acids used to prepare salts of the above-noted adducs may be inorganic or organic. The organic acids may be aliphatic, cycloaliphatic, aromatic or heterocyclic and may be saturated or unsaturated. Examples of the acids include, among others, benzene-sulfonic acid, acetic acid, butyric acid, 2-ethylhexoic acid, decanoic acid, acrylic acid, methacrylic acid, cyclohexanoic acid, benzoic acid, toluic acid, phosphoric acid, boric acid, hydrochlorous acid and the like. Preferred acids are those having up to 18 carbon atoms, and especially the aliphatic monocarboxylic acids containing up to 12 carbon atoms. Especially preferred are the acids having an ionization constant below $1 \times 10^{-3}$.

The salts of the adducts are prepared by merely mixing the adduct with the acid. No external heat is applied and cooling to temperatures below 50° C. is preferably applied, particularly if the reaction is exothermic. The amount of the acid added should be sufficient to form at least one salt group between a mol of the acid and one amino group in the adduct, and preferably should be sufficient so as to reduce the pH of the adduct to at least 9 and preferably to 7.

Preparation of soluble adducts and salts is illustrated by the following:

*Adduct of Polyether D and diethylene triamine.*—100 parts of Polyether D was combined with 102 parts of diethylene triamine in 100 parts of dioxane. A slightly exothermic reaction ensued and the mixture was stirred and heated to reflux where it was held for 3 hours. The reaction mixture was then stripped of unreacted amine and dioxane. The resulting product was a soluble adduct having a molecular weight of about 526.

*Acetic acid salt of Polyether D and diethylene triamine.*—Acetic acid was slowly added to the adduct prepared above. The addition was made at 20–25° C. and continued until the pH of the solution was about 7. The resulting product was a light brown viscous liquid identified as the neutral salt of acetic acid and the triethylene diamine-Polyether D adduct.

In preparing the new colloidal dispersions one reacts any one or more of the above-described polyepoxides with any one or more of the above-described epoxy curing agents to effect a partial reaction between the two. The amount of the polyepoxide and the polyfunctional curing agent to be employed may vary over a wide range, but the polyfunctional curing agent should be employed in at least an equivalent amount and preferably from 1.5 to 4 times the equivalent amount. As used herein and in the amended claims, the expression "equivalent amount" refers to that needed to furnish one reactive hydrogen or reactive functional group (e.g., anhydride group) per epoxy group.

The reaction between the polyepoxide and the polyfunctional curing agent may be effected by merely bringing the two components together in the presence of a small amount of water. The amount of water employed may preferably vary from about one to about 50% by weight of the combined mixture.

Heat may be employed as desired to speed the reaction. However, in some cases, such as with polyamines, the reaction proceeds at a satisfactory rate at room temperature without applying heat. Temperatures generally employed in the reaction vary from about 20° C. to 80° C.

In the event that the polyfunctional curing agents are highly reacted with the polyepoxides, such as in the case of polyamines, it may be desirable to control the pH of the medium. In order to slow down the reaction with the polyamines, it is generally preferred to employ a pH in the range of 8 to 10. This can generally be accomplished by adding appropriate amounts of weak acids, such as acetic acid and the like.

After the reaction commences, care should be taken to see that the reaction is terminated by addition of water before the mixture gels. This addition of water can be made any time after the reaction has proceeded to a point where the mixture becomes homogeneous, but it has been found that the best results are obtained when the quenching of the water is delayed until just before the gelation takes place. The amount of the water employed in the quenching may vary, but it should be in excess of the reaction mixture and preferably from 2 to 20 times the volume of the reaction mixture.

The quenching with the water should be done rather rapidly and with considerable stirring. After the mixture has been stirred for some time, the colloidal will appear as an almost clear liquid.

The colloidal dispersions of the present invention are stable and can be stored at room temperature for many years without undergoing any substantial change in composition or reactivity. By further heating, the colloidal dispersions, however, at temperatures from 50 to 200° C. the dispersions may be rapidly broken to precipitate cured polyepoxides.

The new colloidal dispersions of the present invention have been found to have a high degree of substantivity to cellulosic products. Because of this, new products are particularly suited for use in the treatment of paper either at the wet end or on the finished paper. The expression "wet end" refers to any procedure in paper manufacture from the time the pulp is added to water up to the point where there is more pulp than water, i.e., where the paper is formed and is being dried.

When used for the impregnation of formed paper, the colloidal dispersion is added to an aqueous medium to form a product containing preferably from .1% to 30% by weight of the polyepoxide and more preferably from 1% to 20% by weight of the polyepoxide.

The paper is then impregnated with the above-described aqueous solution by any suitable means, such as by spraying, rolling, dipping, or running through the conventional type padding apparatus. After this, the treated paper is then dried and cured. The drying may be accomplished by exposing the wet paper to hot gas and temperatures ranging from 80 to 100° C. or more preferably as in commercial operation by passing the paper over hot rolls. The period of drying will depend largely on amount of back-up and the concentration of the polyepoxides. In most instances, drying periods of from less than a second to 30 minutes should be sufficient.

Cure of the polyepoxide is then effected. In most cases, this may be accomplished by temperatures as low as 15° C. to as high or higher than 200° C. Preferred curing temperature is 100–170° C. At the lower temperatures, the curing may be accomplished in a few days, such as during the storage period. At the higher temperatures, curing may be accomplished in a few minutes, e.g., 1 to 60 minutes.

If the colloidal dispersion is to be employed at the wet end, the dispersion may be added to the aqueous paper pulp slurry so as to form a mixture having from 0.1% to say 50% by weight of the paper pulp of the polyepoxide. The resulting mixture is then stirred in conventional means and then the paper pulp used to form the desired paper sheets after the paper sheets have been formed is then dried by passing over hot gas or over hot rollers at temperatures of 80 to 100° C. and then cured say at 15° C. to 200° C.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the process of the invention may be used for a variety of applications such as facial tissue, hand towels, maps, filing cards, construction paper, wrapping paper, containers and the like.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE I

This example illustrates the preparation of a colloidal dispersion of a partial reaction product of Polyether A and an adduct of diethylene tramine and Polyether D and the use of this dispersion for the preparation of wet strength paper.

Equal parts by weight of Polyether A and a 25% water solution of a stripped diethylene triamine-Polyether D adduct prepared as noted above were mixed together in a glass reactor. The mixture was heated to 70° C. at which time the materials became homogeneous. The mixture was then stirred until the viscosity began to increase rapidly and then a large volume of cold water was then added to the mixture and the mixture agitated gently. The partial reaction product rapidly disperses to form a transparent solution.

This solution was placed on a shelf and stored for a period in excess of four years. At the end of that time, it was examined and there were no visible signs of any change in the condition of the colloidal.

Additional water was added to the colloidal to form a mixture having a Polyether A content of 5% by weight. Unbleached kraft paper pulp was slurried by mixing in a Waring blender for a period of 1–2 minutes. The aforementioned 5% solution of the colloidal dispersion was then added. pH was adjusted by the addition of a dilute solution of paper alum and the mixture slowly was brought to a final dilution level with distilled water. Sheets of paper were prepared on a circular (7¾" diameter) Valley sheet mold in accordance with TAPPI standard 205–M–53 following which the sheets were placed at a pressure of 50 p.s.i. for 5 minutes. Drying was accomplished on a steam heat cylinder containing steam at about 5 p.s.i. for a period of 25–30 seconds. The sheets were held taut by means of a canvas cover stretched over the cylinder. The sheet was then held in an air oven for 5 minutes at 160° C. The paper was then removed and tested for tensile strength, wet and dry, burst and tear strength. The resulting sheet demonstrated excellent wet and dry tensile strength and good burst and tear strength. Some of the results are shown in the table below in comparison with a similar sheet prepared by the addition of a melamine formaldehyde resin during the beater stage.

| Resin | Resin Conc., Percent w. | Curing Cycle | Tensile Strength, lb./inch | | Strength Retention |
|---|---|---|---|---|---|
| | | | Wet | Dry | |
| Colloidal dispersion | 2 | 5 min. at 160° C. | 13.6 | 40.4 | 33.6 |
| Melamine formaldehyde [1] | 2 | 60 min. at 105° C. | 10 | 30.7 | 32.5 |

[1] Cured with alum to pH 4.5.

EXAMPLE II

Example I was repeated with the exception that in the preparation of the partial reaction product, 50 parts of the 25% solution of curing agent DTA-Polyether D condensation product based on 100 parts of the Polyether A was added to the reaction. In this case, a related clear and stable colloidal dispersion was also obtained. Paper treated with this colloidal dispersion had the following properties:

| Resin | Resin Conc., Percent w. | Curing Cycle | Tensile Strength, lb./inch | | Strength Retention |
|---|---|---|---|---|---|
| | | | Wet | Dry | |
| Colloidal dispersion | 2 | 5 min. at 160° C. | 21.7 | 64.7 | 33.5 |
| | 4 | 5 min. at 160° C. | 26.7 | 66.3 | 40.3 |

EXAMPLE III

Example I was repeated with the exception that 75 parts per 100 parts of Polyether A of the 25% curing agent solution of diethylene triamine Polyether D adduct was employed in a preparation of the colloidal dispersion. A related transparent stable aqueous colloidal dispersion was obtained. Results obtained by applying this colloidal in the treatment of paper is shown in the following table:

| Resin | Resin Conc., Percent w. | Curing Cycle | Tensile Strength, lb./inch | | Strength Retention |
|---|---|---|---|---|---|
| | | | Wet | Dry | |
| Colloidal dispersion | 2 | 5 min. at 160° C. | 23 | 65.5 | 35.5 |
| | 4 | 5 min. at 160° C. | 30 | 70.8 | 42.3 |

EXAMPLE IV

Equivalent parts by weight of Polyether A and a 25% solution of the diethylene triamine-Polyether D adduct prepared as above were combined in a glass reactor. The mixture was heated at 70° C. until the material became homogeneous. Shortly after the mixture became homogeneous, a large quantity of water was added and agitated gently. The resulting product was a transparent colloidal dispersion. This dispersion was used to treat kraft paper described in Example I. The resulting paper had good wet strength and good burst and tear strength. Some of the results are shown in the following table:

| Resin | Resin Conc., Percent w. | Curing Cycle | Tensile Strength, lb./inch | | Strength Retention |
|---|---|---|---|---|---|
| | | | Wet | Dry | |
| Colloidal dispersion | 2 | 5 min. at 120° C. | 18.1 | 65.1 | 27.8 |
| | 4 | 5 min. at 120° C. | 25.4 | 69.5 | 36.6 |

EXAMPLE V

Example I is repeated with the exception that Polyether A was replaced by an equivalent amount of diglycidyl ether of ethylene glycol A stable aqueous colloidal dispersion having related properties is obtained.

EXAMPLE VI

Example I is repeated with the exception that Polyether A is replaced by Polyether C. A stable aqueous colloidal dispersion having related properties is obtained.

EXAMPLE VII

Example I is repeated with the exception that the curing agent employed is metaphenyl diamine. An aqueous colloidal dispersion having related properties is obtained.

EXAMPLE VIII

Example I is repeated with the exception that the curing agent employed is an adduct of ethylene diamine and Polyether A, a stable aqueous colloidal dispersion having related properties is obtained.

EXAMPLE IX

The colloidal dispersion prepared in Example I was used to impregnate the various types of paper to improve their wet and dry strength. This was accomplished by adding the colloidal dispersion to an aqueous padding solution and to form a solution having the desired concentration of the Polyether A and then the paper was impregnated by dipping in this solution. The impregnated paper was then dried and cured for 5 minutes at 160° C. The resulting paper had excellent wet and dry tensile strength, good burst strength and good tear strength. The tensile strength of the treated paper is shown in the table below in comparison to the results obtained by impregnating the paper with a suspension of Polyether A and the same curing agent obtained by mixing the two in water with hydrolyzed polyvinyl acetate emulsifying agent.

| Resin | Resin Conc., Percent w. | Curing Cycle | Tensile Strength, lb./inch | | Strength Retention |
|---|---|---|---|---|---|
| | | | Wet | Dry | |
| Colloidal dispersion | 2 | 5 min. at 160° C. | 22.3 | 66 | 34.8 |
| | 4 | 5 min. at 160° C. | 28.4 | 66.8 | 42.5 |
| Suspension | 2 | 5 min. at 160° C. | 14.0 | 58.4 | 24.3 |
| | 4 | 5 min. at 160° C. | 18.0 | 56.7 | 31.9 |

EXAMPLE X

Example I is repeated with the exception that the Polyether A is replaced with equivalent amount of each of the following: 3,4-epoxycyclohexylmethyl 3,4-epoxycyclohexanecarboxylate, epoxidized vinylcyclohexene and epoxidized 2,2-bis(4-cyclohexenyl)propane.

We claim as our invention:

1. A process for preparing a stable colloidal dispersion of a partially cured polyepoxide which comprises reacting in the presence of at least a small amount of water a polyepoxide having more than one vic-epoxy group and having some solubility in water with a polyfunctional epoxy curing agent and before gelation takes place quenching the reaction with an amount of water in excess of the reaction mixture and then stirring until the colloidal dispersion appears as an almost clear liquid.

2. A process for preparing a stable colloidal dispersion of a partially cured polyepoxide which comprises reacting, in the presence of at least a small amount of water, (1) a polyepoxide having more than one vic-epoxy group and having some solubility in water, with (2) a polyfunctional epoxy curing agent having a plurality of free amino hydrogen atoms, and before gelation takes place quenching the reaction with an amount of water in excess of the reaction mixture and then stirring until the colloidal dispersion appears as an almost clear liquid.

3. A process for preparing a stable colloidal dispersion of a partially cured polyepoxide which comprises reacting, in the presence of at least a small amount of water, (1) a glycidyl polyether of a polyhydric alcohol, with (2) a polyamino hydrogen-containing epoxy curing agent, and after the mixture has become homogeneous but before gelation takes place quenching the reaction with from 2 to 20 times the volume of water and stirring until the colloidal dispersion appears as an almost clear liquid.

4. A process as in claim 3 wherein the epoxy curing agent is an adduct of a polyamine and a polyepoxide.

5. A process as in claim 3 wherein the glycidyl polyether under (1) is glycidyl polyether of glycerol, and the epoxy curing agent under (2) is an acetone-soluble adduct of diethylene triamine and a glycidyl polyether of a polyhydric phenol.

6. A process as in claim 3 wherein the reaction medium has a pH between 8 and 10.

7. A process for preparing paper having improved wet strength which comprises applying at some time during the production of paper from paper pulp to finished paper to the paper product present at that stage an aqueous colloidal dispersion of a reaction product of a polyepoxide having more than one vic-epoxy group and a polyfunctional epoxy curing agent which reaction product is free of gel, and then heating to effect cure of the polyepoxide.

8. A process for preparing paper having improved wet strength which comprises adding an aqueous colloidal dispersion of a reaction product of a polyepoxide having more than one vic-epoxy group and a polyfunctional epoxy curing agent which reaction product is free of gel to an aqueous suspension of paper pulp at the wet end, forming paper from the resulting product, drying the paper and then heating at a temperature between 100° C. and 200° C. to effect cure of the polyepoxide.

9. A process for preparing paper having improved wet strength which comprises adding an aqueous colloidal dispersion of a reaction product of (1) a polyepoxide having more than one vic-epoxy group and (2) an epoxy curing agent consisting of a soluble reaction product of a glycidyl polyether of 2,2-bis(4-hydroxyphenyl)propane and diethylene triamine, which reaction product of (1) and (2) is free of gel, to an aqueous suspension of paper pulp at the wet end, forming paper from the resulting product, drying the paper and then curing at 150° C. to 200° C.

10. A process for preparing paper having improved wet strength which comprises impregnating a paper with an aqueous colloidal dispersion of a reaction product of a polyepoxide having more than one vic-epoxy group and having some solubility in water and a polyfunctional epoxy curing agent containing a plurality of amino hydrogen atoms which product is free of gel, drying the paper and curing at 150° C. to 200° C.

References Cited in the file of this patent

UNITED STATES PATENTS

| | | |
|---|---|---|
| 2,707,708 | Wittcoff | May 3, 1955 |
| 2,801,229 | De Hoff et al. | July 30, 1957 |
| 2,844,552 | Glaser | July 22, 1958 |
| 2,909,448 | Schroeder | Oct. 20, 1959 |
| 2,912,389 | Phillips et al. | Nov. 10, 1959 |
| 2,913,356 | Schroeder | Nov. 17, 1959 |
| 2,928,808 | Belanger | Mar. 15, 1960 |